(12) United States Patent
Wang

(10) Patent No.: US 10,048,670 B2
(45) Date of Patent: Aug. 14, 2018

(54) AUTOMATION OPERATING AND MANAGEMENT SYSTEM

(71) Applicant: BEET, LLC, Plymouth, MI (US)

(72) Inventor: David Jingqiu Wang, Northville, MI (US)

(73) Assignee: BEET, LLC, Plymouth, MI (US)

(*) Notice: Subject to any disclaimer, the term of this patent is extended or adjusted under 35 U.S.C. 154(b) by 443 days.

(21) Appl. No.: 14/705,421

(22) Filed: May 6, 2015

(65) Prior Publication Data

US 2015/0323926 A1 Nov. 12, 2015

Related U.S. Application Data

(60) Provisional application No. 61/990,148, filed on May 8, 2014, provisional application No. 61/990,151, filed
(Continued)

(51) Int. Cl.
*G06F 19/00* (2018.01)
*G05B 19/048* (2006.01)
(Continued)

(52) U.S. Cl.
CPC ............ *G05B 19/048* (2013.01); *G05B 11/01* (2013.01); *G05B 19/0423* (2013.01);
(Continued)

(58) Field of Classification Search
CPC .... G05B 19/418; G05B 19/048; G05B 11/01; G05B 19/409; G05B 23/0216;
(Continued)

(56) References Cited

U.S. PATENT DOCUMENTS

| 5,705,906 A | 1/1998 | Tanabe et al. |
| 6,222,535 B1 | 4/2001 | Hurd, II |

(Continued)

FOREIGN PATENT DOCUMENTS

| DE | 1020061034681 A1 | 1/2008 |
| EP | 0909616 A1 | 4/1999 |

(Continued)

*Primary Examiner* — Michael D Masinick

(74) *Attorney, Agent, or Firm* — Quinn IP Law

(57) ABSTRACT

An automation operating and management system consolidates and analyzes inputs from multiple machines within an automated enterprise to predict failures and provide instructions for counteractions to prevent failures during machine operation, and to identify opportunities for efficiency improvement, including actions for reduction in peak power consumption demand within a facility including multiple machines. A machine can include a machine controller and at least one base layer controller, where the base layer controller acts as a low level controller to directly control the motion of elements in communication with the base layer control, according to parameters set by the machine controller. The base layer controller collects timing data for the elements under its control, compares the timing data with the parameters and sets an alarm when the timing data is outside of tolerance limits defined by the parameters.

11 Claims, 8 Drawing Sheets

Related U.S. Application Data on May 8, 2014, provisional application No. 61/990,156, filed on May 8, 2014, provisional application No. 61/990,158, filed on May 8, 2014, provisional application No. 61/990,159, filed on May 8, 2014, provisional application No. 61/990,163, filed on May 8, 2014, provisional application No. 61/990,169, filed on May 8, 2014, provisional application No. 61/990,170, filed on May 8, 2014, provisional application No. 61/990,172, filed on May 8, 2014.

(51) Int. Cl.
| | |
|---|---|
| *G05B 19/418* | (2006.01) |
| *G05B 19/042* | (2006.01) |
| *G05B 23/02* | (2006.01) |
| *G05B 19/409* | (2006.01) |
| *G05B 11/01* | (2006.01) |

(52) U.S. Cl.
CPC ....... *G05B 19/0426* (2013.01); *G05B 19/409* (2013.01); *G05B 19/418* (2013.01); *G05B 23/0216* (2013.01); *G05B 23/0272* (2013.01); *G05B 2219/25387* (2013.01); *G05B 2219/25407* (2013.01); *G05B 2219/31368* (2013.01); *G05B 2219/31472* (2013.01); *G05B 2219/35472* (2013.01); *G05B 2219/39447* (2013.01)

(58) Field of Classification Search
CPC ............ G05B 19/0426; G05B 19/0423; G05B 23/0272; G05B 2219/35472; G05B 2219/31472; G05B 2219/39447; G05B 2219/25407; G05B 2219/2538; G06Q 10/103
USPC .................................. 700/19, 162; 718/102
See application file for complete search history.

(56) References Cited

U.S. PATENT DOCUMENTS

| | | | |
|---|---|---|---|
| 6,459,949 | B1 | 10/2002 | Black et al. |
| 6,668,208 | B2 | 12/2003 | Baumbusch et al. |
| 7,392,100 | B1 | 6/2008 | Thomas et al. |
| 7,528,710 | B2 | 5/2009 | Halfmann et al. |
| 8,028,197 | B1 | 9/2011 | Barua et al. |
| 2005/0039192 | A1 | 2/2005 | Chavez, Jr. et al. |
| 2005/0050210 | A1 | 3/2005 | Kennedy |
| 2005/0086248 | A1 | 4/2005 | Atchison |
| 2005/0246045 | A1* | 11/2005 | Sugihara ................ G06Q 10/06 700/109 |
| 2006/0253225 | A1 | 11/2006 | Ueno et al. |
| 2007/0219835 | A1 | 9/2007 | Steinbach et al. |
| 2009/0119147 | A1 | 5/2009 | Messer |
| 2009/0164933 | A1 | 6/2009 | Pederson et al. |
| 2010/0082388 | A1 | 4/2010 | Dixit et al. |
| 2010/0211429 | A1 | 8/2010 | Benson |
| 2010/0304683 | A1 | 12/2010 | Gasperi et al. |
| 2011/0035693 | A1 | 2/2011 | Ueno et al. |
| 2012/0062577 | A1 | 3/2012 | Nixon |
| 2012/0079407 | A1 | 3/2012 | Holmes et al. |
| 2012/0188087 | A1* | 7/2012 | Wang .................... H04L 67/303 340/657 |
| 2012/0310865 | A1 | 12/2012 | Wang |
| 2013/0144407 | A1* | 6/2013 | Nausley ................ G05B 23/02 700/79 |
| 2014/0028441 | A1 | 1/2014 | Amran |
| 2014/0156055 | A1* | 6/2014 | Desrousseaux ........ G05B 19/05 700/162 |

FOREIGN PATENT DOCUMENTS

| | | |
|---|---|---|
| EP | 1273723 A1 | 1/2003 |
| EP | 2077473 A1 | 7/2009 |
| EP | 2690514 A2 | 1/2014 |
| EP | 2728427 A1 | 5/2014 |
| JP | 2004355195 A | 12/2004 |
| WO | 2013143585 A1 | 10/2013 |

* cited by examiner

AUTOMATION OPERATING AND MANAGEMENT SYSTEM

CROSS-REFERENCE TO RELATED APPLICATIONS

This application claims the benefit of U.S. Provisional Application 61/990,148 filed May 8, 2014, U.S. Provisional Application 61/990,151 filed May 8, 2014, U.S. Provisional Application 61/990,156 filed May 8, 2014, U.S. Provisional Application 61/990,158 filed May 8, 2014, U.S. Provisional Application 61/990,159 filed May 8, 2014, U.S. Provisional Application 61/990,163 filed May 8, 2014, U.S. Provisional Application 61/990,169 filed May 8, 2014, U.S. Provisional Application 61/990,170 filed May 8, 2014, and U.S. Provisional Application 61/990,172 filed May 8, 2014, which are each hereby incorporated by reference in their entirety.

TECHNICAL FIELD

The present disclosure relates generally to operating and managing automated equipment, including collecting and capturing automation data using an automation controller in communication with a computing device.

BACKGROUND

A facility may include multiple machines. Each machine can be controlled by a programmable logic controller (PLC) or similar controller connected to multiple machine elements, power sources and sensors of the machine. The controller in communication with the sensors receives sensor inputs to the controller indicating condition states of the various elements. The controller may be programmed to scan at a predetermined frequency through a scan cycle, defined for example, by a sequence of operations (SOP) to be performed by the elements of the machine, and, based on the sensor inputs and condition states received by the controller, selectively energize the power sources to actuate the elements to perform operations defined by the program. Each machine and its associated controller may be operated independently from each other machine. When the inputs provided by each controller of the independent machines are not consolidated for analysis, opportunities to increase facility efficiency and decrease facility downtime can be missed.

SUMMARY

An automation operating and management system is provided which consolidates and analyzes inputs from multiple machines within an automated enterprise to predict failures and provide instructions for counteractions to prevent occurrence of failures during machine operation, and to identify opportunities for efficiency improvement, including actionable opportunities for reduction in peak power consumption demand within a facility including multiple machines. The enterprise can include multiple facilities, each of which includes a plurality of automated machines.

The automation system for controlling, operating and/or management of an enterprise including machines performing automated operations includes a plurality of machines. Each of the machines of the plurality of machines includes a machine controller and a plurality of elements. The machine controller is configured to control the plurality of elements to perform an operational sequence and to collect data, which can include timing data, generated during performance of the operational sequence by the plurality of elements. The system includes a server in communication with each of the plurality of machine controllers to collect the data, including timing data.

In one example, the server includes programming for predicting a failure of at least one element of the plurality of elements using the data, which can include timing data and other data such as condition state data, collected from the plurality of machine controllers. In response to predicting the failure, the server can generate an instruction to the machine controller of the respective machine including the at least one element, where the instruction is a countermeasure to prevent failure of the at least one element during operation of the respective machine. In one example, the countermeasure is a command to substitute a back-up element for the at least one element, where the back-up element is substituted prior to failure of the at least one element, such that downtime is planned and minimized and/or avoided, and the enterprise is "self-healing", e.g., proactively acts to prevent the failure of a machine and/or element in the enterprise.

The system can further include a facility comprising the server, a first facility system including the plurality of machines, and a second facility system. In this example, the server in communication with the second facility system to collect facility system data from the second facility system, and the server includes programming for predicting the failure of the at least one element of the plurality of elements in the facility using the data, which can include timing data and non-timing data such as condition state data, collected from the plurality of machine controllers, in combination with the facility system data collected from the second facility system. By way of example, the second facility system can be one of an infrastructure system for controlling a power supply of the facility, a product assurance system, and a production control system.

In one example, at least one machine of the plurality of machines includes a first station including at least a first element of the plurality of elements, and a second station including at least a second element of the plurality of elements. The machine further includes a first base layer controller in communication with the machine controller and the first station to directly control the first element according to parameters received from the machine controller by the first base layer controller, and further includes a second base layer controller in communication with the machine controller and the second station to directly control the second element according to parameters received from the machine controller by the second base layer controller. The first station includes a first sensor for sensing a first condition state of the first element and the second station includes a second sensor for sensing a second condition state of the second element. The first base layer controller and the second base layer controller are in communication with each other such that the first base layer controller communicates the first condition state to the second base layer controller and the second base layer controller communicates the second condition state to the first base layer controller. In one example, the first base layer controller selectively actuates the first element in response to the first condition state and the second condition state, and the second base layer controller selectively actuates the second element in response to the first condition state and the second condition state.

In one example, the first base layer controller can include a first data matrix for storing data collected from the first station. The data can include timing data and can include other data such as condition state data, power consumption data, etc. which can be collected from the first station. A data matrix may also be referred to herein as a timing data matrix. The second base layer controller can include a second data matrix for storing data, which can include timing data, collected from the second station. The machine controller can collect the data, which can include timing data, from the first data matrix and the second data matrix and can use the collected data, including timing data, to coordinate control functions of the first and second base layer controllers. The first base layer controller can compare the data collected from the first station to the parameters received from the machine controller, and can set an alarm when one or more values of the data elements of the collected data is outside of the parameters. The second base layer controller can compare the data collected from the second station to the parameters received from the machine controller, and can set an alarm when one or more values of the data elements of the collected data is outside of the parameters.

In another example, the automation operating system can be used to control a machine comprising a first controller, a first element actuable by the first controller at machine start-up to perform a first cycle characterized by a first cycle time, and a second element actuable by the first controller at machine start-up to perform a second cycle characterized by a second cycle time. In one example, the first cycle time is longer in duration than the second cycle time such that in operation, the first controller actuates the first element to perform the first cycle at machine start-up and delays actuation of the second element to perform the second cycle by a first delay time, such that the second element performs the second cycle at a delayed start time relative to the machine start-up. In this example, the sum of the duration of the first delay time and the second cycle time is less than the first cycle time. This control method is advantaged by decreasing power consumption demand at machine start-up without increasing the duration of time the workpiece remains in the machine, as the duration of time the workpiece remains in the machine continues to be controlled by the cycle time of the element performing the cycle of longest duration. In the present example, the first controller delays actuation of the second element by the delay time when the sum of the duration of the delay time and the second cycle time is less than a predetermined limit, where the predetermined limit is less than the first cycle time. The system can include a power source for energizing the first element and the second element, where the power source is in communication with the first controller. The first control can command the power source to energize the first element at machine start-up and can command the power source to energize the second element at the delayed start time.

In this example, the machine can further include a second controller and a third element actuable by the second controller at machine start-up to perform a third cycle characterized by a third cycle time, where the third cycle time is shorter in duration than the first cycle time. The second controller can delay actuation of the third element to perform the third cycle by a second delay time, such that the third element performs the third cycle at a delayed start time relative to the machine start-up, where the sum of the duration of the second delay time and the third cycle time is less than the first cycle time, and the duration of the first delay time can be different from the duration of the second delay time. Continuing with this example, the machine can further include a third controller in communication with the first controller and the second controller, where the third controller includes programming defining a sequence of operations including the first, second and third cycles, and where the first delay time and the second delay time are defined by the sequence of operations, and the first controller receives the first delay time from the third controller, and the second controller receives the second delay time from the third controller. The third controller can collect actual timing data for the first cycle and actual timing data for the second cycle from the first controller, and can collect actual timing data for the third cycle from the second controller, then use the actual timing data which has been collected to determine at least one of the first delay time and the second delay time.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
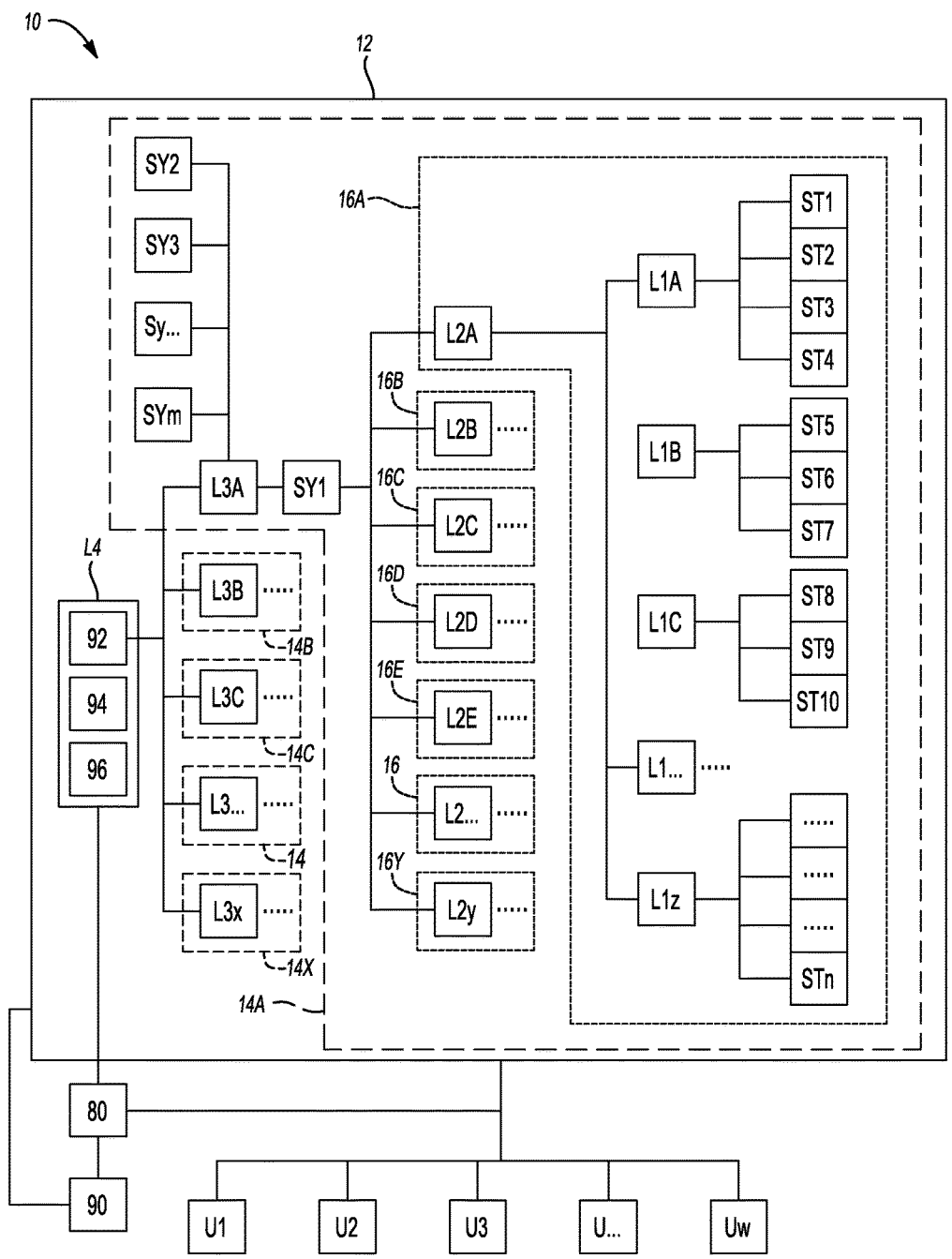
FIG. 1 is a schematic view of an example of an automation operating and management system including first, second, third and fourth level controllers.

Referring to the drawings wherein like reference numbers represent like components throughout the several figures, the elements shown in FIGS. 1-13 are not to scale or proportion. Accordingly, the particular dimensions and applications provided in the drawings presented herein are not to be considered limiting. FIG. 1 shows an automation operating and management system 10 for controlling systems, machines, and elements operating within an enterprise 12. The automation operating and management system 10 may be referred to herein as an automation operating system (AOS). The enterprise 12 includes an enterprise server L4, which may also be referred to herein as a fourth layer server, for receiving and consolidating data from multiple facilities 14 (shown in the example of FIG. 1 as facilities 14A ... 14x and referred to herein collectively as facilities 14) within the enterprise 12. Each of the facilities 14 includes a facility server L3, which may also be referred to herein as a third layer server, for receiving and consolidating data from multiple facility systems SY (shown in the example of FIG. 1 as systems SY1 ... SYm and referred to herein collectively as systems SY) within each of the facilities 14. Each facility server L3 is in communication with the enterprise server L4. At least one of the facility systems SY in each of the facilities 14 (shown in the example of facility 14A as system SY1) includes multiple machines 16 (shown in the example of FIG. 1 as machines 16A ... 16y and referred to herein collectively as machines 16). The machines 16 can be any machines that perform coordinated operations including automated machines. In an illustrative and non-limiting example described herein the machines 16 can be machines such as automated machines performing operations in a manufacturing plant and/or an assembly facility. The enterprise server L4 can be embodied as one or more computer devices having a processor 94 and a memory 92, some of which is computer-readable tangible, non-transitory memory arranged on a printed circuit board or otherwise available to the processor 94. Instructions embodying the methods described herein may be programmed into memory 92 and executed as needed via the processor 94 to provide functionality of the AOS 10 as described herein. The memory 92 may include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, current/voltage/temperature/speed/position sensing circuitry, analog-to-digital (A/D) circuitry, digital-to-analog (D/A) circuitry, a digital signal processor, and any necessary input/output (I/O) devices and other signal conditioning and/or buffer circuitry. The enterprise server L4 can include a communications interface 96 for communication with other controllers and/or servers in the enterprise 12, including for example, for communication with each of a third layer server L3, a second layer controller L2 and a first layer controller L1 of the enterprise 12. The fourth layer (enterprise) server L4, third layer servers L3, second layer controllers L2 and first layer controllers L1 can be in communication with each other via a network 80, which may be a wired or wireless network.

AOS 10 can include a data storage memory 90 which can be used to store data received from one or more of the fourth layer server L4, third layer servers L3, second layer controllers L2 and first layer controllers L1. By way of example, the data storage memory 90 may be accessed via the network 80 and/or may be external to the enterprise 12, for external data storage. The data storage memory 90 can be accessible via the enterprise server L4 and/or via the network 80. The data storage memory 90 can include, by way of example, sufficient read only memory (ROM), optical memory, flash or other solid state memory, and the like to store data received from the enterprise 12. Transitory memory such as random access memory (RAM) and electrically-erasable programmable read-only memory (EEPROM) may also be included, along with other required circuitry (not shown), including but not limited to a high-speed clock, analog-to-digital (A/D) circuitry, digital-to-analog (D/A) circuitry, a digital signal processor, and any necessary input/output (I/O) devices and other signal conditioning and/or buffer circuitry.

AOS 10 can further include one or more user devices (shown in the example of FIG. 1 as user devices. U1 ... Uw and referred to herein collectively as user devices U) in communication with the enterprise 12, via a wired connection or a wireless connection, for example, via the network 80. By way of non-limiting example, a user device U can be a computing device such as a personal computer, tablet, laptop, smart phone, personal digital assistant, or other personal computing device for viewing information including data related to and/or provided by the enterprise 12. In one example, the user device U can display a machine control interface for one or more of the machines 16. The user device U can include a user interface such as a touch screen for interacting with the information and data of the enterprise 12 and/or for controlling the machine 16 via the machine control interface.

In the example shown, each of the machines 16 includes a second layer controller L2 and one or more first layer controllers L1. Each of the machine controllers L2 (shown in the example of FIG. 1 as machine controllers L2A ... L2y and referred to herein collectively as machine controllers L2) within a respective facility 14 are in communication with the respective facility controller L3 for that facility 14. A second layer controller L2 may also be referred to herein as a machine controller. Each machine controller L2 of a respective machine 16 is in communication with the first layer controllers L1 of that respective machine. A first layer controller L1 may be referred to herein as a base layer controller. The machine controllers L2 and the base layer controllers L1 can each perform specific functions in controlling and monitoring the operation of the machine 16. Each machine controller L2 and each base layer controller L1 can be embodied as one or more computer devices having a processor and memory, some of which is computer-readable tangible, non-transitory memory arranged on a printed circuit board or otherwise available to the processor. Instructions may be programmed into the memory of each of the machine controllers L2 and each of the base layer controllers L1 and executed as needed via the processor of the respective controller L2, L1 to provide the control functionality over the machines 16 and/or elements E within the control of each respective machine controller L2 and/or each respective base layer controller L1. The memory of each machine controller L2 and each base layer controller L1 can include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, current/voltage/temperature/speed/position sensing circuitry, analog-to-digital (A/D) circuitry, digital-to-analog (D/A) circuitry, a digital signal processor, and any necessary input/output (I/O) devices and other signal conditioning and/or buffer circuitry. Each machine controller L2 and each base layer controller L1 can include one or more monitoring, measuring and/or control devices for monitoring, measuring and/or controlling the machines 16 and/or elements E within the control of each respective machine controller L2 and/or each respective base layer controller L1.

Figure 2:
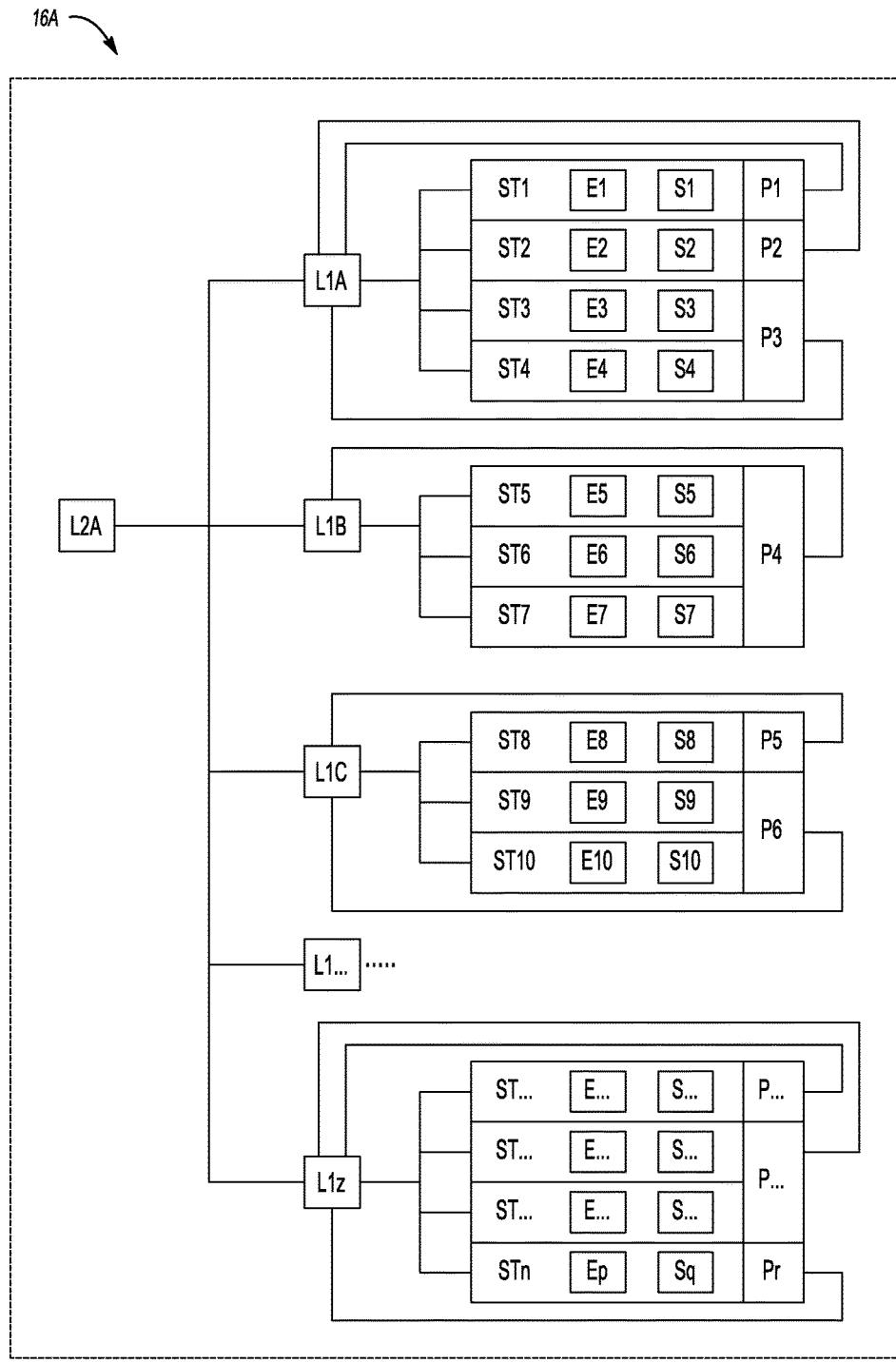
FIG. 2 is a schematic view of an example of a machine including a first level controller and a second level controller.

Each machine 16 includes a plurality of stations ST (shown in the example of FIGS. 1 and 2 as stations ST1 . . . STn and referred to herein collectively as stations ST) for performing an operational cycle of the machine 16, where the operational cycle includes operations of the machine 16 performed in a predetermined sequence controlled by the base layer controller L1 and/or the machine controller L2 of the machine 16. The predetermined sequence in which the operations in the operational cycle is performed can be defined by a sequence of operations 39 and/or a portion of a sequence of operations 39 defined for that machine 16 by the machine controller L2 of the machine 16. It would be understood that the machine 16 would, in operation, repeatedly perform the operational cycle comprising the sequence of operations 39 under control of the machine controller L2 and/or the base layer controller L1.

Each of the base layer controllers L1 (shown in the example of FIGS. 1 and 2 as base layer controllers L1A . . . L1z and referred to herein collectively as the base layer controllers L1) controls operations performed by at least one of the stations ST in communication with the respective base layer controller L1. As shown in FIG. 2, each station ST includes one or more elements E (shown in the example of FIG. 2 as elements E1 . . . Ep and referred to herein collectively as elements E), for performing various operations and/or tasks of the respective station ST. Using an illustrative example of a manufacturing and/or assembly enterprise 12, examples of elements E used to perform the various operations of a manufacturing and/or assembly operation performed by a machine 16 and/or station ST can include clamps, cylinders, collets, pins, slides, pallets, etc., where the examples provided herein are non-limiting.

Each station ST further includes one or more power sources P (shown in the example of FIG. 2 as power sources P1 . . . Pr and referred to herein collectively as power sources P), for providing power to one or more elements E and for selectively energizing a respective element E in response to a signal from the base layer controller L1. Each station ST further includes one or more sensors S (shown in the example of FIG. 2 as sensors S1 . . . Sq and referred to herein collectively as sensors S), for sensing a state of at least one of the elements E and the power source P of the station ST and providing an input to the base layer controller L1 indicating the state sensed by the sensor S.

A state, which may be referred to as a condition state or as a condition, as used herein, refers to a state of the object, a condition, a status, a position, or other property being monitored, measured and/or sensed. Non-limiting examples of condition states including cycle start time, cycle stop time, element start time, element travel, element stop time, position of an element or object, a dimensional measurement of an object which can include a dimensional measurement of a feature of an element E, a feature of a machine 16, a feature of a workpiece (not shown) to which an operation is being performed by a machine 16 or an element E, a condition of one or more of an element E, machine 16 or workpiece, or a condition of the environment within the facility 14. A condition state could further include for example, operating conditions such as on, off, open, closed, auto, manual, stalled, blocked, starved, traveling, stopped, faulted, OK, good, bad, in tolerance, out of tolerance, present, not present, extended, retracted, high, low, etc., and can include for example, a measure of a physical property such as chemistry, temperature, color, shape, position, dimensional conditions such as size, surface finish, thread form, functional parameters such as voltage, current, torque, pressure, force, etc., such that it would be understood that the terms state, condition and/or condition state as describing inputs to the AOS 10 are intended to be defined broadly.

By way of non-limiting example, a sensor S may be configured as a limit switch, a proximity switch, a photo eye, a temperature sensor, a pressure sensor, a flow switch, or any other type of sensor which may be configured to determine if one or more states are met during operation of the automated system 10, and to provide an output to the at least one automation controller, such as the base layer controller L1 and/or the machine layer controller L2, which is received by the controller L1, L2 as an input corresponding to the state determined by the sensor S. The sensor S output may be configured, for example, as a signal provided to the base layer controller L1 and/or to the machine layer controller L2, and received by the base layer controller L1 and/or to the machine layer controller L2 as an input including input data. The sensor S may be configured to provide a discrete or bit-form output. The sensor S may be configured as an analog sensor and may provide an analog output signal corresponding to one or more of multiple states of a element E or a group of elements E associated with the sensor S, or one or more of multiple states of an environment of the machine 16 and/or the environment of the facility 14 including the machine 16.

The predetermined sequence of operations in the operational cycle can be defined by a sequence of operations 39 and/or a portion of a sequence of operations 39 defined for that machine 16 by the machine controller L2 of the machine 16. In one example, the machine controller L2 can perform the functions of the machine controller L2 and the base layer controllers L1, such that the machine 16 can be configured without the base layer controllers L1. In this example, the machine 16 would, in operation, repeatedly perform the operational cycle comprising the sequence of operations 39 under the independent control of the machine controller L2.

In another example, the controller functions may be divided between the base layer controllers L1 and the machine controller L2, with the base layer controllers L1 functioning as low level controllers and the machine controllers L2 functioning as a high level controller coordinating the operation of the base layer controllers L1 within the machine 16. In this example, the machine 16 would, in operation, repeatedly perform the operational cycle comprising the sequence of operations 39 under the control of the machine controller L2 and the base layer controllers L1, where the machine controller L2 acts as a data collector collecting the condition state data for each of the elements E of the machine 16 from each of the respective base layer controllers L1, and acts as a local area controller to coordinate and control the interaction of the base layer controllers L1 with each other. In this example, each base layer controller L1 within the machine 16 is in communication with each other base layer controller L1 within the machine 16 and with the machine controller L2 to communicate condition states of each of the elements E controlled by that respective base layer controller L1, such that each base layer controller L1 can execute control actions of the respective elements E under the control of the respective base layer controller L1 in response to the condition state data received from the other base layer controllers L1 in the machine 16.

For illustrative purposes and by way of non-limiting example, the enterprise 12 shown in FIGS. 1 and 2 may be a production enterprise including a plurality of manufacturing and/or assembly facilities 14, such as facilities 14A, 14B and 14C. In one example, the facilities 14A, 14B and 14C may be co-located within the production enterprise 12, for example, each of the facilities 14A, 14B and 14C may be sub-factories or assembly lines co-located in a larger building defining the production enterprise 12. In another example, each of the facilities 14A, 14B and 14C may be a stand-alone factory which may be geographically separated from each other and in communication with each other and the enterprise server 12, for example, via the network 80. Facility 14A, for illustrative purposes, is shown in additional detail in FIGS. 1 and 2, and includes a facility server L3A which is in communication with multiple systems SY such as systems SY1, SY2 and SY3 operating in the facility 14A. In the example shown, system SY1 includes manufacturing and/or assembly operations consisting of multiple machines 16 such as machines 16A, 16B, 16C, 16D and 16E.

In the illustrative example, machine 16A is shown in additional detail in FIG. 2, consisting of multiple stations ST such as stations ST1 through ST10. Machine 16A includes a machine controller L2A in communication with multiple base layer controllers L1 such as base layer controllers L1A, L1B and L1C. Each of the base layer controllers L1A, L1B and L1C acts to control multiple stations ST according to instructions received from the machine controller L2A, to perform operations, for example, defined by a sequence of operations 39 stored in the machine controller L2A. For example, as shown in FIG. 2, base layer controller L1A can control the operations of stations ST1, ST2, ST3, ST4 by selectively activating the power sources P1, P2 and P3 to selectively actuate elements E1, E2, E3 and E4. The base layer controller L1A receives sensor outputs from the sensors S1, S2, S3 and S4 which indicate condition states, for example, of the elements E1, E2, E3 and E4. The base layer controller L1A is in communication with base layer controllers L1B and L1C in the present example, and receives condition state input from base layer controllers L1B and L1C indicating the condition states of elements E5 through E10. The base layer controller L1A selectively actuates the elements E1, E2, E3 and E4 according to instructions stored in the memory of the base layer controller L1A, inputs and instructions received from the machine controller L2A and in response to the condition states of the elements E1 through E10, in the present example, received by the base layer controller L1A. The examples described herein and shown in FIGS. 1 and 2 related to machine 16A are illustrative and non-limiting. For example, each of the machines 16 controlled and/or managed by AOS 10 could include a machine controller L2, however could differ in including a base layer controller L1 and/or the number of base layer controllers L1 included in the machine 16, and could differ in the number, arrangement, function, etc. of the stations ST, elements E, sensors S and power sources P from the illustrative example of machine 16A shown in FIGS. 1 and 2.

In the present illustrative example, facility systems SY2 and SY3 shown in FIGS. 1 and 2 can operate in the facility 14A and can be operated and/or managed using the AOS 10 in a manner and/or to provide outputs which can affect the operations of system SY1 in facility 14A, including affecting the efficiency and/or downtime of the machines 16 included in the system SY1. Each of the systems SY2, SY3 includes one or more servers (not shown, referred to herein as a SY server) which can be embodied as one or more computer devices having a processor and memory, some of which is computer-readable tangible, non-transitory memory arranged on a printed circuit board or otherwise available to the processor. Instructions may be programmed into the memory of each SY server and executed as needed via the processor of the SY server to provide monitoring and/or control functionality over the facility operations within the control of the respective SY system. The memory of the SY server can include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, current/voltage/temperature/speed/position sensing circuitry, analog-to-digital (A/D) circuitry, digital-to-analog (D/A) circuitry, a digital signal processor, and any necessary input/output (I/O) devices and other signal conditioning and/or buffer circuitry. Each of the systems SY2, SY3 can include one or more monitoring, measuring and/or control devices and/or sensors for monitoring, measuring and or sensing a state of the facility operations within the control of the respective SY system.

In the present illustrative example of a production enterprise 12, system SY2 can be a facility management system, which may be referred to herein as a facility infrastructure system SY2, for monitoring, measuring and/or controlling various factors of the infrastructure and operating environment of facility 14A, such as electrical power supply provided to the various power sources P, water supply provided to hydraulic and/or coolant systems within the facility 14A and/or coolant systems related to the machines 16, compressed air supply provided within the facility 14A, for example, to pneumatic systems of the machines 16, to pneumatically operated elements E, and/or to pneumatically controlled manual tools such as pneumatic torch wrenches which may be used in manufacturing and/or assembly operations within the facility 14A. It would be understood that variability in each of the electrical power supply, water supply, and compressed air supply could affect the operation, efficiency and downtime of one or more of the machines 16 and/or elements E. For example, a decrease in the pressure of the compressed air supply provided to a pneumatically controlled element E such as a cylinder may decrease the speed at which the cylinder element E travels, increasing the cycle time required for the cylinder element E to travel when performing an operation of a machine 16. For example, an increase in temperature of cooling water circulating in a cooling water jacket of a machine 16 such as a welding machine, may change the efficiency of heat transfer from a work area of the machine 16, affecting the tool life of the welding elements E in the machine 16 and/or the cooling rate of the welds being formed in a product welded by the machine 16. For example, variability in the voltage level of the incoming power supply provided to a power source P can affect the response time of a clamp element E activated by the power source P, thereby affecting the cycle time of the operation performed by the clamp element E. By way of example, system SY2 can monitor, measure, and/or control ambient conditions within the facility 14A, or within a portion of the facility 14A, such as temperature, humidity, etc. For example, the facility 14A may be portioned into multiple zones 98 such as zones 98A, 98B, 98C shown in FIG. 5, where at least one of the machines 16 is located in each zone. By way of example, one of the zones 98A, 98B, 98C can include machines 16 which are performing operations sensitive to ambient temperature and/or humidity conditions, such as an electronics fabrication operation or a painting operation, such that variability in the ambient temperature and/or humidity in that zone may affect the quality of the product produced by the machines 16 in that area. These examples are non-limiting and for illustrative purposes, and it would be understood that variability within facility controlled systems and conditions such as power supply, water supply, compressed air supply, temperature, humidity, etc. can affect the operation of the machines 16, elements E and/or can affect the quality and/or condition of the products produced by and/or the services provided by the machines 16 in multiple ways too numerous to include herein. System SY2 can transmit signals (inputs) to the facility server L3A indicating condition states of the various factors of the operating environment of facility 14A being monitored, measured, and/or controlled by the facility server L3A.

In the present illustrative example of a production enterprise 12, system SY3 can include production control and product assurance operations and can monitor, measure and/or control various factors of the production control and product assurance operations which impact the operation of manufacturing and production system SY1 of facility 14A. For example, the production control operations of system SY3 can monitor inventory levels (on order, in transit, in stock) of machine parts for the machines 16, which may include replaceable service parts (motors, etc.) sensors S (limit switches, etc.) and/or elements E which can include durable (reusable) elements such as clamps, cylinders, etc. and/or consumable (replaceable) elements E such as drills, taps, clamp pads, etc. required for a station ST to complete an operation and/or for the machine 16 to operate. In another illustrative example, the production control operations of system SY3 can monitor inventory levels (on order, in transit, in stock) of vendor supplied (purchased) components and/or material which are provided to the machines 16, for example, as raw material or work pieces on which operations are performed by the machines 16, or are provided to the machines 16, for example, as components to be assembled with other components to form a finished assembly. The product assurance operation, for example, can monitor the condition of vendor supplier (purchased) components and/or materials and indicate the acceptance or rejection of the vendor supplied materials, which could affect the availability of that inventory to the machines 16. In another illustrative example, the product assurance operation can measure and output a condition state of a component or raw material to the facility server L3 and/or to a machine controller L2 of a machine 16 processing the component or raw material, such that the machine 16 in response can adjust settings based on the measured condition state of the incoming component or raw material. For example, a machine 16 may be an oven to temper components made from raw material. The machine 16 via the facility controller L3 can receive hardness data for the raw material from the product assurance system SY3 and adjust the tempering temperature of the oven based on the hardness of the raw material. These examples are non-limiting and for illustrative purposes, and it would be understood that the condition of components and/or raw material monitored and/or measured by the product assurance operations of the system SY3, the inventory levels of components and/or raw material and the availability of machine parts for the machines 16 and elements E controlled and monitored by the production control operations of the system SY3 can affect the operational efficiency and/or downtime of the machines 16 and/or elements E and/or can affect the quality and/or condition of the products produced by and/or the services provided by the machines 16 in multiple ways too numerous to include herein. System SY3 can transmit signals (inputs) to the facility server L3A indicating condition states of the various factors of the operating environment of facility 14A being monitored, measured, and/or controlled by the facility server L3A.

In the present illustrative example, the facility server L3A acts as a data collector within the AOS 10 for collecting the inputs received from the systems SY1, SY2 and SY3, and can analyze and use the accumulated data and inputs to identify and respond to operating conditions throughout the facility 14A, including implementing preventive actions to minimize downtime, efficiency losses and/or productivity losses, by controlling and modifying the operations within the facility 16A, which can include outputting commands to the machine controllers L2A through L2E and outputting commands to systems SY2 and SY3, for example, in response to condition states and inputs received from the machine controllers L2A through L2E and systems SY2 and SY3, to modify the operating conditions within the facility 14A, the sequence of operations 39 performed by the various stations ST, the machines 16 and/or stations ST used to perform one or more operations, etc., to improve efficiency, decrease and/or optimize power consumption within the facility, increase productivity, reduce or avoid downtime, etc. in response to the analysis of the data by the facility server L3A. The AOS 10 is advantaged by accumulating the data and inputs from multiple production (SY1) and non-production (SY2, SY3) systems and multiple machines within a facility 14, analyzing the accumulated data and inputs using a facility server L3 to identify issues which may not be identifiable by the independent machine controllers L2, for example where such issues may result from interactions of multiple inputs which are outside the scope of inputs controlled by any one of the machine controllers L2, and/or which may be identifiable only by combination of inputs from multiple sources (multiple machines 16, a machine 16 and system input from one or more of systems SY2, SY3, etc.), and using the AOS 10 to identify, action responses to, manage and/or prevent issues using the collective resources of the facility 14.

In the present illustrative example, the enterprise server L4 acts as a data collector for the inputs and data received from the facility servers L3A, L3B and L3C. The enterprise server L4 can analyze and use the accumulated data and inputs to control and modify the operations within one or more of the facilities 16A, 16B, 16C, 16D and 16E, including implementing preventive actions to minimize downtime, efficiency losses and/or productivity losses, by controlling and modifying the operations of one or more of the facilities 16A, 16B, 16C, 16D and 16E, in response to an issue or condition identified in one or more of the facilities 16A, 16B, 16C, 16D and 16E, which can include, for example, transferring production between facilities 16 in anticipation of or in response to a downtime event, to increase efficiency based on the operational condition of a machine 16 in one facility 14 as compared to an identical and/or substantially similar machine 16 in another facility 14, to respond to inputs received from the non-production systems SY2 and/or SY3 indicating for example, a facility power supply issue or incoming material issue, etc. The AOS 10 is advantaged by accumulating the data and inputs from facilities 14, analyzing the accumulated data and inputs using the enterprise server L4 to identify issues which may not be identifiable by the independent facility servers L3, for example where such issues may result from interactions of multiple inputs which are outside the scope of inputs controlled by or received into any one of the facility servers L3, and/or which may be identifiable only by a combination of inputs from multiple facilities L4, and using the AOS 10 to identify, action responses to, manage and/or prevent issues using the collective resources of the enterprise 12.

The examples described herein and shown in FIGS. 1 and 2 related to facility 14A are illustrative and non-limiting, and it would be understood that the facilities 14 other than facility 14A included in the enterprise 12 can each include at least one machine 16 configured similar to machine 16A to include a base layer controller L1 and a machine controller L2, however the number and configuration of each of the machines 16 may vary within a facility 14 and from one facility 14 to another facility 14, and each of the machines 16 may include elements E and sensors S arranged in stations ST other than those described for the example of machine 16A to perform operations other than those performed as described for machine 16A.

The example of an enterprise 12 including facilities 14 such as manufacturing plants and/or assembly facilities is not intended to be limiting. An AOS 10 as described herein can be applied to the control and management of any type of enterprise 12 including machines 16 performing coordinated operations, and as such it would be understood that the terms enterprise 12, facility 14, machine 16, element E and sensor S are intended to be defined broadly. By way of non-limiting example, an enterprise 12 can be an amusement park including an AOS 10, where the facilities 14 and machines 16 are defined by different areas of the amusement park and the systems SY can include, for example, a security system for the amusement park and an infrastructure system (water, power, waste disposal, etc.) of the amusement park. In such an example, an amusement ride facility 14A can include machines 16 forming the amusement rides, an admission ticketing facility 14B can include machines 16 for receiving and securing payment for tickets, a dining facility 14C can include machines 16 for providing food service, a parking facility 14C can include machines 16 for receiving parking fees and monitoring and patrolling the parking area, etc. In another non-limiting example, an enterprise 12 including an AOS 10 may be a property development, such as an office building complex, where each facility 14 includes one or more buildings within the complex, and the machines 16 operating in each facility 14 include, for example, elevators, security cameras, heating and ventilation equipment, etc.

Figure 3:
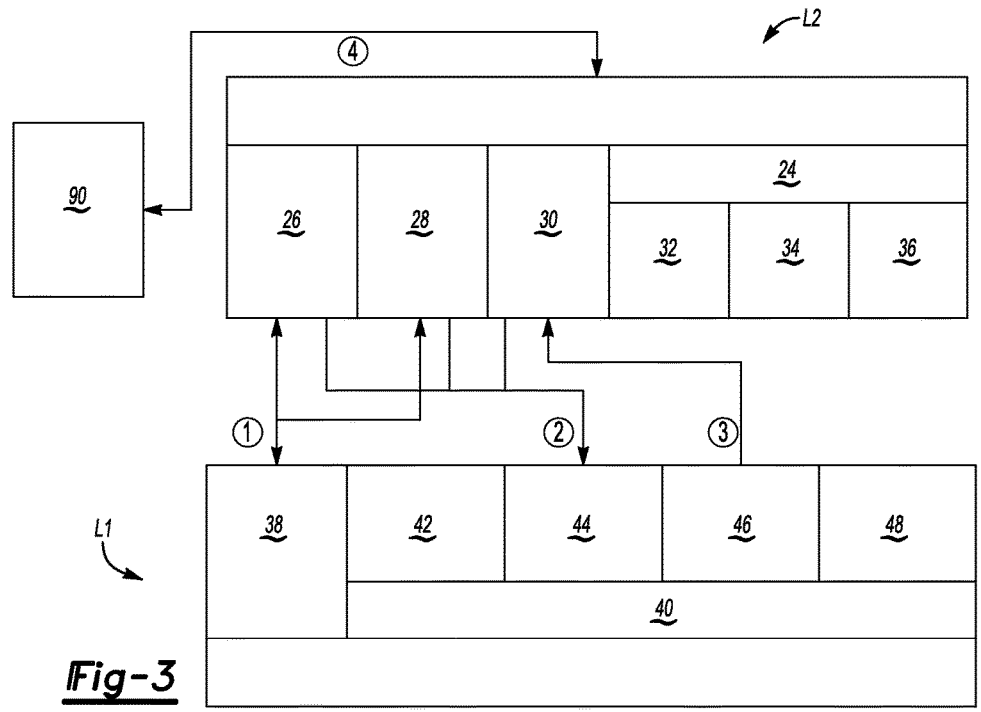
FIG. 3 is a schematic view of an example of a first level controller and a second level controller of the system of FIG. 1.

FIG. 3 illustrates the division of controller functions within the AOS 10 between the machine controller L2 and the base layer controllers L1 of a machine 16 to control the operations of the multiple stations ST of the machine 16, and such that the machine controller L2 performs high level control functions and the base layer controllers L1 perform low level functions in controlling the operation of the machine 16. In an illustrative non-limiting example, the machine controller L2 shown in FIGS. 3 and 4 can be machine controller L2A for controlling the operation of machine 16A shown in FIGS. 1 and 2, and the facility controller L3 shown in FIG. 4 can be the facility controller L3A shown in FIGS. 1 and 2 in communication with the machine controller L2A. Machine 16A includes a first base layer controller L1A controlling stations ST1, ST2, ST3 and ST4, a second base layer controller L1B controlling stations ST5, ST6, and ST7, and a third base layer controller L1C controlling stations ST8, ST9, and ST10. Each of the base layer controllers L1A, L1B and L1C are in communication with each other and with the machine controller L2A. The base layer controller L1 shown in FIG. 3 can be, for illustrative purposes, the base layer controller L1A shown in FIGS. 1 and 2 for controlling the operation of stations ST1, ST2, ST3 and ST4 of the machine 16A, where station ST1 is powered by power source P1, station ST2 is powered by power source P2, and stations ST3 and ST4 are powered by power source P3. The power sources P1, P2, and P3 can be hydraulic, electrical, or pneumatic, or a combination of these. Station ST1 includes at least one element E1 actuable by the base layer controller L1A to perform an operation of the machine 16, and includes at least one sensor S1 to sense a condition state of the at least one element E1. Similarly, stations ST2, ST3 and ST4 each include a respective element E2, E3 and E4 to perform a respective operation of the machine 16, and a respective sensor S2, S3, S4 to sense a condition state of the respective element E2, E3 and E4.

As shown in FIG. 3, a base layer controller L1 such as the base layer controller L1A includes a processor 38 and a memory 40, some of which is computer-readable tangible, non-transitory memory arranged on a printed circuit board or otherwise available to the processor 38. In an illustrative example, instructions may be programmed into the memory 40 of the base layer controller L1A and executed as needed via the processor 38 to control the elements E1, E2, E3 and E4 in communication with the base layer controller L1A. The memory 40 of the base layer controller L1A can include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, analog-to-digital (A/D) circuitry, digital-to-analog (D/A) circuitry, current/voltage/temperature/speed/position sensing circuitry, a digital signal processor, and any necessary input/output (I/O) devices and other signal conditioning and/or buffer circuitry. The base layer controller L1A includes a communication interface 48 for communicating with, for example, the machine controller L2A, the other base layer controllers L1B and L1C of the machine 16A, the sensors S1, S2, S3 and S4 (S1 . . . S4), the power sources P1, P2, P3 and P4 (P1 . . . P4), and the elements E1, E2, E3 and E4 (E1 . . . E4). The operation of the base layer controller L1A is limited to performing low level functions in controlling the operation of the elements E1 . . . E4, such that the base layer controller L1A is configured as an automation controller, with the memory 40 including an automation control memory 42, a supervisory parameter memory 44, a sensory timing data matrix 46, and other memory as required to perform the functions described herein. The automation control memory 42 of the base layer controller L1A stores programming required to directly control the motions of the elements E1 . . . E4, where the motions are controlled, e.g., the elements E1 . . . E4 are actuated via the power sources P1 . . . P4, by the base layer controller L1A, in response to the condition states of the elements E1 . . . E10 communicated to the base layer controller L1A, and according to parameters received by the base layer controller L1A from the machine controller L2A and stored in the supervisory parameter memory 44 of the base layer controller L1A. The condition states of the elements E1 . . . E4 are received by the base layer controller L1A as sensor outputs from the sensors S1 . . . S4 and stored in memory 40, for example, in the sensory timing data matrix 46. The condition states of the elements E5 . . . E10 are communicated to the base layer controller L1A from the base layer controllers L1B and L1C. The timing of condition transitions for each of the elements E1 . . . E4 when performing an operation commanded by the automation controller function of the base layer controller L1A is stored in memory 40, for example, in the sensory timing data matrix 46. Timing data stored in the sensory timing data matrix 46 can include, for example, a start time and a stop time for each motion or operation step performed by each of the elements E1 . . . E4, and a cycle time for each motion or operation step performed by each of the elements E1 . . . E4. The timing data stored in the sensory timing data matrix 46 can be retrieved by the machine controller L2A for collection, analysis and/or storage by the machine controller L2A. The parameters stored in the supervisory parameter memory 44 can include tolerance limits for each of the condition states sensed by the sensors S1 . . . S4, and/or tolerance limits for the timing of condition transitions for each of the elements E1 . . . E4 when performing an operation commanded by the automation controller function of the base layer controller L1A. The base layer controller L1A can compare the actual timing data for each occurrence of each operation step and/or motion performed by each of the elements E1 . . . E4 to the tolerance limits applicable to that timing data, and can set an alarm which is communicated to the machine controller L2A when the timing data is outside of the tolerance limits. The alarm may be displayed on a machine control interface 84 displayed on a user device U as a fault, as shown for element E4 in FIG. 13. In summary, the low level functions of the base layer controller L1A include control of the motion of each of the elements E1, E2, E3 and E4 controlled by the base layer controller L1A according to parameters set by the machine controller L2A, collecting and storing data received from the sensors S1 . . . S4, including condition state data and timing data of condition transitions for each of the elements E1 . . . E4, comparing the condition state data and/or timing data to predetermined tolerances for the data, and sending an alarm to the machine controller L2A when the condition state data and/or the timing data of the condition transitions for any of the elements E1 . . . E4 is outside of tolerance limits received from the machine controller L2A.

As shown in FIG. 3, a machine controller L2 such as, in an illustrative example, the machine controller L2A, includes a processor 30 and memory 24, some of which is computer-readable tangible, non-transitory memory arranged on a printed circuit board or otherwise available to the processor 30. Instructions may be programmed into the memory 24 of the machine controller L2A and executed as needed via the processor 30 to control functionality of the machine 16A including the base layer controllers L1. The memory 24 of the machine controller L2A can include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, analog-to-digital (A/D) circuitry, digital-to-analog (D/A) circuitry, current/voltage/temperature/speed/position sensing circuitry, a digital signal processor, and any necessary input/output (I/O) devices and other signal conditioning and/or buffer circuitry. The machine controller L2A includes a communication interface 36 for communicating with the facility server L3A and the base layer controllers L1A, L1B and L1C of the machine 16A. The machine controller L2A can, in one example, communicate with one or more of the user devices U connected to the machine controller L2A via the network 80, which can include displaying a machine control interface 84 to a user of the user device U which can be used by the user to monitor data and other information of the machine 16A. The machine controller L2A functions as a data collector and as a high level controller, e.g., as a local area controller for the machine 16A, in controlling and coordinating, in the illustrative example, the operations of the base level controllers L1A, L1B and L1C, such that the machine controller L2A functions as an automation supervisory controller 26 and a safety controller 28 for the machine 16A including stations ST1 . . . ST10. The memory 24 includes automation and safety control memory 32, supervisory parameter memory 34, and other memory as required to perform the functions described herein. The automation and safety control memory 32 stores and runs programming required to control and coordinate the control functions of the base layer controllers L1A, L1B and L1C. The programming stored in the automation control memory 32 can include, for example, a sequence of operations 39 defining the motions performed by the stations ST1 . . . ST10 and/or the elements E1 . . . E10, which may be provided to the machine controller L2A as controller logic such as ladder logic, state logic, or other logic expressed in a programming language, and executed by the machine controller L2A and the base level controllers L1A, L1B and L1C to repeatedly perform an operational cycle defined by the sequence of operations 39, including cycle steps performed by the stations ST1 . . . ST1 and elements E1 . . . E10. The supervisory parameter memory 34 stores supervisory parameters received by the machine controller L2A from the facility controller L3A.

Still referring to FIG. 3, path 1, indicated in the figure by the circled number 1, illustrates both the automation supervisory controller 26 and the safety controller 28 can communicate bi-directionally with the base layer controller L1A. Path 2, indicated in FIG. 3 by the circled number 2, shows the automation supervisory controller 26 and the safety controller 28 can set values in the supervisory parameter memory 44 of the base layer controller L1A, for example, to define operating conditions for the base layer controller L1A. Path 3, indicated in FIG. 3 by the circled number 3, illustrates the machine controller L2A collecting data, including for example, condition state data and timing data, from the base layer controller L1A. Path 4, indicated in FIG. 4 by the circled number 4, illustrates the data collected by the machine controller L2A from the base layer controllers L1A, L1B and L1C that can be stored in data storage memory 90, which can be an external memory storage. The data stored in data storage memory 90 can be accessed, for example, by the enterprise controller L4 for monitoring and analysis.

Figure 4:
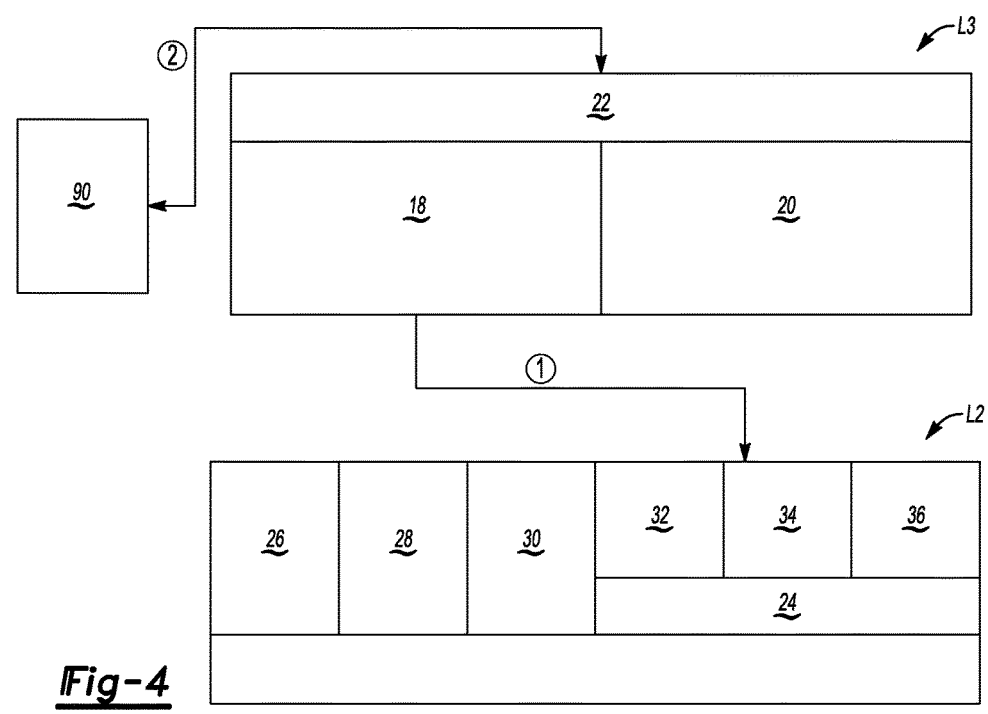
FIG. 4 is a schematic view of an example of a second level controller and a third level controller of the system of FIG. 1.
Figure 5:
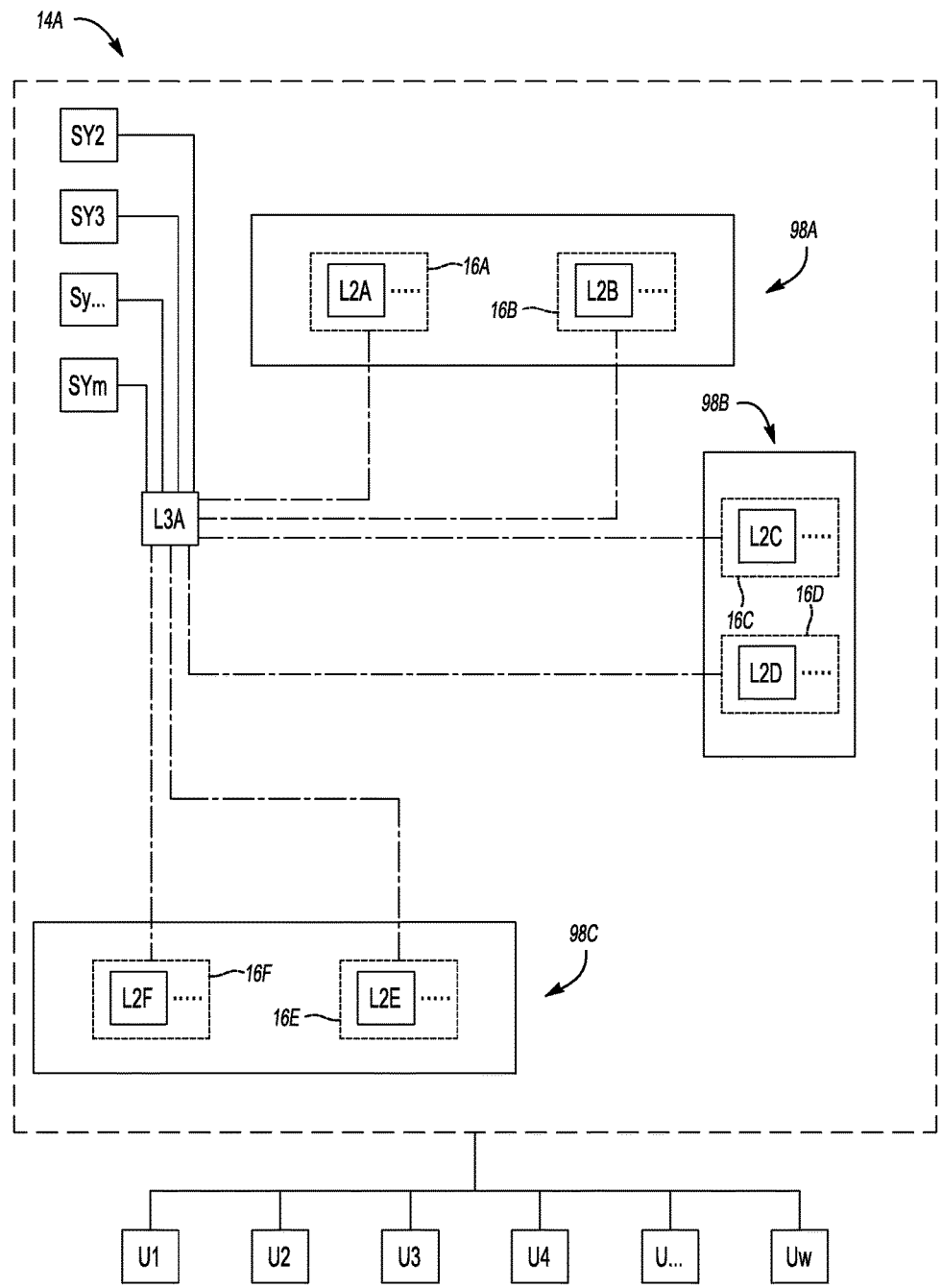
FIG. 5 is a schematic view of a facility management system of the system of FIG. 1, showing a plurality of machines grouped in zones.

Referring to FIG. 4, a facility server L3 such as, in an illustrative example, the facility server L3A, includes a processor 18 and memory 20, some of which is computer-readable tangible, non-transitory memory arranged on a printed circuit board or otherwise available to the processor 18. The facility controller L3A, in the illustrative example, is in communication with the machine controllers 16A . . . 16E, systems SY2, SY3 and the enterprise server L4. Instructions may be programmed into the memory 20 of the facility controllers L3A and executed as needed via the processor 18 to collect data from the machine controllers 16 and the systems SY2 and SY3, to analyze the collected data, and to provide instructions to one or more of the machine controllers 16A . . . 16E and/or the systems SY2 and SY3 in response to the data and/or the results of the data analysis. The memory 20 of the facility server L3A can include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, analog-to-digital (A/D) circuitry, digital-to-analog (D/A) circuitry, current/voltage/temperature/ speed/position sensing circuitry, a digital signal processor, and any necessary input/output (I/O) devices and other signal conditioning and/or buffer circuitry. The facility server L3A includes a communication interface 22 for communicating with the machine controllers L2A . . . L2E, systems SY2, SY3, the enterprise server L4, data storage memory 90 and/or the network 80. The facility server L3A in the illustrative example, can function within the AOS 10 as an application server and control processing controller, analyzing all the data which is received from the machine controllers L2A . . . L2E and the systems SY2, SY3, including tracking historical performance of each element E within the facility 14A, where the analysis performed is configured to foresee potential failures of machines 16 and/or elements E within the facility 14A, and to instruct lower level controllers such as machine controllers L2A . . . L2E to execute counteractions to avoid the potential failure. Data analysis performed by the facility server L3 can include historical analysis, trend analysis, predictive analysis, reliability analysis, multi-factor analysis including combining data from multiple machines 16 and/or from machines 16 and systems SY2, SY3, benchmark analysis, etc., to identify existing and/or potential issues within the facility 14A and to generate instructions to resolve, counteract and/or preferably prevent the issue occurrence. The facility server L3 can communicate with the enterprise server L4, for example, to provide overall performance monitoring, control and management for the enterprise 12 via the AOS 10.

In an illustrative example, a facility 14 may have a station ST including a robot element E controlled by a base layer controller L1. The facility 14 can maintain one or more back-up robot elements E in inventory, which may be tracked and/or reported by a production control system SY. The facility server L3 in performing analysis of data collected from the machine controllers L2 in the facility 14, including historical data related to the performance of robot elements E, may predict, based on current data received for the robot element E which is currently in operation in the station ST, a probable failure of the robot element E within a predetermined number of operating cycles. The facility server L3 can instruct the machine controller L2 and the system SY to substitute the back-up robot element E for the robot element E currently in service, thereby preventing failure of the robot element E while operating in the station ST, avoiding the unplanned downtime and/or other consequences related to a failure of the robot element E while operating, and minimizing the downtime of the station ST and/or the machine 16 by expeditiously substituting the back-up robot element E prior to the failure of the robot element E currently in operation, where the base layer controller L1 controls the back-up robot element E to perform the same functions and/or operations previously performed by the removed robot element E.

Figure 13:
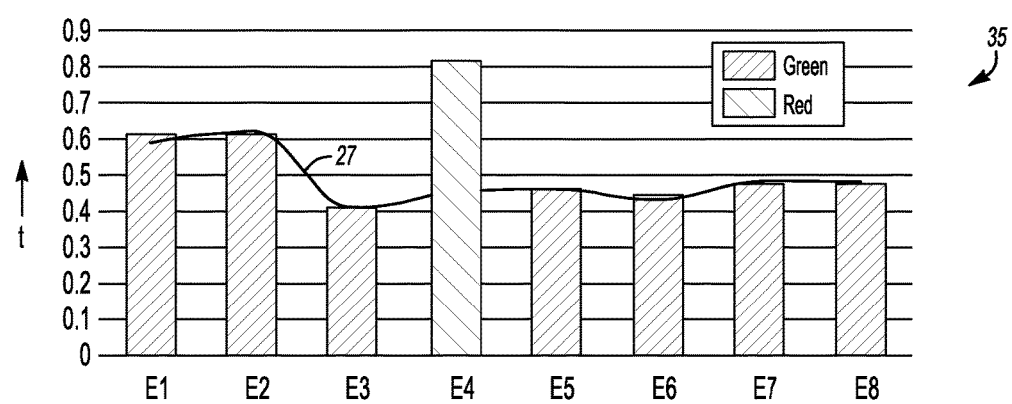
FIG. 13 is a schematic illustration of an example of a machine heartbeat of a group of elements of the machine of FIG. 2.

In another example, and referring to FIG. 13, a machine 16 can include a plurality of elements E1 . . . E8 which are clamps. In an illustrative example, the machine 16 may be an assembly line configured to assemble vehicles, where malfunctioning of a clamp element E in the assembly line 16 causes shut down of the entire assembly line to allow a maintenance worker to gain access to the malfunctioning clamp element E. The cycle time of each operational cycle performed by each clamp element E can be monitored by a base layer controller L1 controlling the motion of the clamp element E and compared with a parameter tolerance for the cycle time of the clamp element E. In the example shown in FIG. 13, the cycle time of the group of clamp elements E is displayed, where each vertical bar shows the cycle time of a respective clamp element E relative to a baseline parameter or tolerance for the cycle time of the respective clamp element E. In the example shown in FIG. 13, the cycle time data of the group of clamp elements E is displayed as a heartbeat of the group of clamp elements E, as described in U.S. Pat. No. 8,880,442 B2 issued Nov. 14, 2014 to the inventor and incorporated by reference herein. As shown in the example of FIG. 13, clamp element E4 has executed an operational cycle having a cycle time in excess of the baseline parameter shown by line 27. The base layer controller L1 controlling the motion of the clamp element E4 when comparing the actual cycle time to the baseline parameter sets an alarm to the machine controller L2, which in turn signals a fault to the facility server L3. The facility server L3 may analyze the data provided to determine, for example, if the fault is a random occurrence or an indicator that the clamp element E should be removed from operation and a back-up clamp substituted, to minimize downtime of the assembly line to the downtime required to substitute in the back-up clamp and/or prevent the unplanned downtime and/or other efficiency or operational loss which could be associated with a failure of the clamp element E4.

The examples provided herein are non-limiting, and are simplified for illustrative purposes. It would be understood that the scope and complexity of data analysis performed by the facility servers L3 and/or the enterprise server L4 can be substantially more complex than that indicated by the illustrative examples, such that the AOS 10 can be configured and used to predict potential failures of elements within a facility and allow time to automatically deploy countermeasures, including substitution of back-up elements E and/or diversion of production from one machine 16 to another machine 16, to counteract potential downtime, loss of operational efficiency, or other loss due to unplanned failures in the operation of the facility 14, machines 16 and/or elements E. The countermeasures which may be deployed by the AOS 10 are not limited to the substitution of back-up elements E, and may include, for example, diverting production from one machine 16 to another machine 16, diverting production from one zone 98 to another zone 98, modifying a sequence of operations 39 to perform the required operation using modified cycle times, modified combinations of elements E and/or stations ST, etc. The AOS 10 as described herein is advantaged by providing a control methodology which divides the control functions of a machine 16 between a base layer controller L1 and a machine controller L2, which expedites the collection and analysis of data, which can include timing data, by the machine controller L2, facility server L3 and/or the enterprise server L4, to allow for predictive and/or preemptive identification of a potential issue or failure within the facility operation and/or a machine 16 and instruction of countermeasures to diffuse the issue and/or prevent the failure, thus creating an operating and management system 10 which enables self-healing of the enterprise 12, e.g., the implementation of countermeasures prior to failure to substantially reduce and/or eliminate downtime within the operations of a facility 14 and/or for a machine 16.

Figure 6:
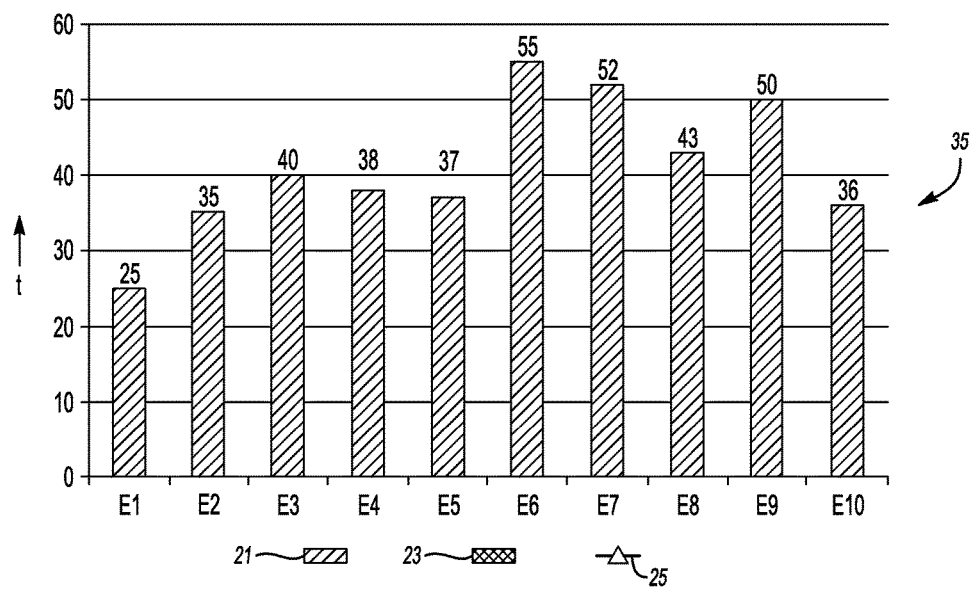
FIG. 6 is a schematic illustration of an example of a cycle time chart for the machine of FIG. 2.
Figure 7:
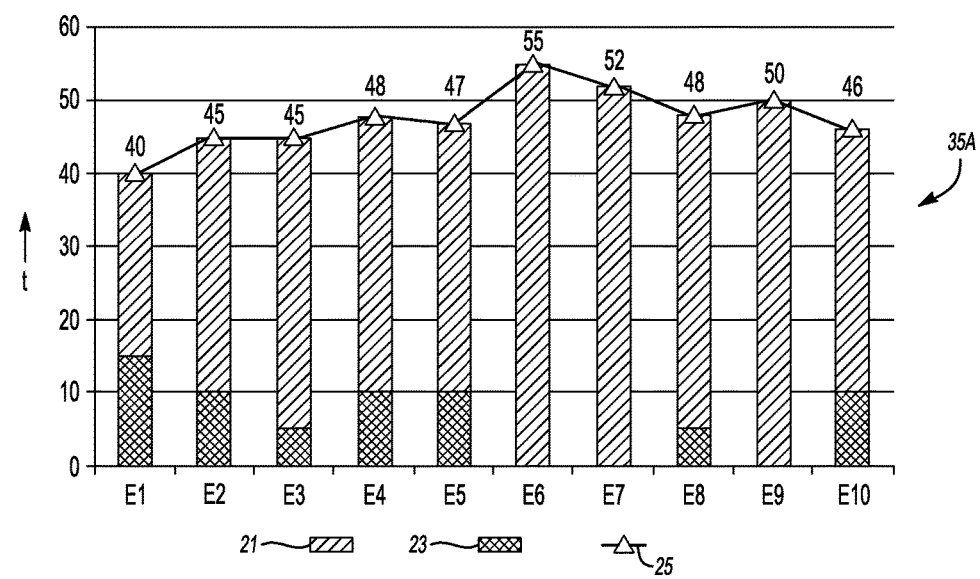
FIG. 7 is a schematic illustration of an example of a modified cycle time chart for the machine of FIG. 2.

The AOS 10 can collect and analyze data to identify other opportunities to improve the efficiency of operating the enterprise 12. In one example illustrated by FIGS. 2, 6 and 7, the data collected by the AOS 10 can be used to modify the start times of selected elements E within a machine 16 to reduce power consumption, and to reduce the peak power consumption demand experienced at machine start-up. In the illustrative example, FIG. 6 shows a heartbeat display 35 of the cycle times for each of the elements E1 through E10 (E1 . . . E10) of stations ST1 through ST10 (ST1 . . . ST10) of machine 16A shown in FIG. 2. In the illustrative example, elements E1 . . . E10 are each actuable by and/or controlled by one of the base layer controllers L1A, L1B and L1C to perform operations in a sequence of operations (SOP) 39 coordinated by the machine controller L2A. Base layer controller L1A controls stations ST1 . . . ST4, base layer controller L1B controls stations ST5 . . . ST7, and base layer controller L1C controls stations ST8 . . . ST10. In a non-limiting example shown in FIGS. 5 and 6 a legend is provided which includes a legend feature 21 corresponding to a cycle time of an event E, a legend feature 22 corresponding to a delay time associated with an event E, and a legend feature 25 corresponding to a sum of the cycle time and associated delay time of an event E. As shown in an illustrative example in FIG. 6, the cycle time for the operations performed by the elements E1 . . . E10 vary from one element E to another, with element E1 having the shortest cycle time at 25 milliseconds, and element E6 having the longest cycle time at 55 milliseconds. In a typical operating example shown in FIG. 6, each of the base layers controllers L1A, L1B, L1C is started at the same start time, such that at time 0, each of the stations ST1 . . . ST10 through its respective power source P1 . . . P10 is drawing power from a power supply of the facility 16 to energize elements E1 . . . E10 in preparation for activating the elements E1 . . . E10 at each of their respective cycle start times as defined by the SOP 39. The simultaneous energizing of each of the stations ST1 . . . ST10 and elements E1 . . . El0 at the start of the operational cycle defined by the SOP 39 causes a power consumption demand which is peak, e.g., at its maximum, at start-up of the machine 16. The AOS 10 described herein can be used to collect data, which can include timing data, for each machine 16, station ST and element E, which can be analyzed, for example, by the facility server L3 to determine opportunities to delay energizing and/or start times of selected stations ST and/or elements E to decrease peak power consumption by staggering the start times of the selected elements E as shown in the example illustrated by FIG. 7. By modifying the start times of selected elements E, the peak power consumption demand of the power supplies provided by the facility 14 are decreased, and in turn, the total power consumed in executing the SOP 39, e.g., in completing the operational cycle including cycles of the elements E1 . . . El0, is decreased. As shown in FIG. 6, each of the elements E1 . . . E4 and E8 . . . E10 have cycle times which are substantially shorter than the cycle times of elements E6 and E7, and as such, the start time of each of the elements E1 . . . E4 and E8 . . . E10 can be modified, e.g., delayed, to a modified start time as shown by the modified heartbeat display 35A of FIG. 7, where each of the elements E1 . . . E4 and E8 . . . E10 will complete its respective cycle prior to elements E6 and E7, with no impact to throughput of the workpiece through the machine 16, as the elements E6 and E7 with the longest cycle times have not been modified, and the total time the workpiece is in the machine 16 for completion of the SOP 39 performed by that machine 16 has not changed, e.g., remains unchanged at 55 milliseconds in the present example. For example, as shown by FIGS. 6 and 7, the start time of the 35 second cycle performed by element E2 has been delayed by a delay time having a duration of 10 milliseconds relative to machine start-up, e.g., relative to the start of the cycle performed by element E6, and such that the operation performed by element E2 is completed at 45 milliseconds from machine start-up and ahead of completion of the longest operation performed by element E6 and having a cycle time of 55 milliseconds. It would be understood, as shown by the example of FIG. 7, that the start times of selected elements E to be modified may be modified by different amounts, to minimize power consumption peaking later in the machine cycle. Further, it would be understood that modification of the cycle start times only requires that the modified cycles be completed prior to the cycle having the longest cycle time (in the example, the cycle of element E6 at 55 milliseconds), and that the modified cycles do not necessarily have to, and preferably are not, completed at the same time as the longest cycle. In the example shown, the cycle start times of the modified cycles are staggered to decrease peak energy consumption, but are modified such that all of the modified cycles are completed within a predetermined range defined by the longest unmodified cycle, where in the example show the upper limit of the predetermined range is less than the longest unmodified cycle. In the example shown, each of the modified cycles of elements E1 . . . E5 and E8 . . . E10 are modified to be completed within a predetermined range between 40 and 50 milliseconds after machine start-up, where the start time of the longest cycle being performed by element E6 coincides with machine start-up of the machine 16, such that all of the modified cycles are completed at least 5 milliseconds prior to completion of the longest cycle, e.g., the cycle of element E6. The cycle time of element E7 at 52 milliseconds is less than the longest cycle time, e.g., less than the 55 second cycle time of element E6, however longer in duration than the upper limit of 50 milliseconds defined by the predetermined range of 40 to 50 milliseconds. As such, the cycle time of element E7 is not modified, and elements E7 and E6 are concurrently actuated at machine start-up. The predetermined range for completing the modified cycles can be determined by the facility controller L3 based on one or more of historical data, anticipated variability in the cycle time of each of the elements E, the type of each element E having its cycle start time modified, the requirements of the SOP 39, etc.

By decreasing the peak power consumption demand, the power supplies of the facility 14 can potentially be downsized, decreasing the infrastructure and/or operating (energy) costs of the facility 14. The use of modified start times as shown in FIG. 7 is further advantaged by decreasing the peak power consumption demand on each of the power supplies of the facility 14, which decreases variability in the level of power supplied by the power supply at machine start-up, e.g., decrease variability in the level of electrical voltage, hydraulic pressure, and/or pneumatic air pressure supplied to the power sources P1 . . . P10 at machine start-up, to provide a more consistent and uniform level of power to the power sources P1 . . . P10, thus preventing and/or decreasing process variation caused by power variability. The effect of the power consumption reduction is multiplied by the number of machines 16 in the facility 14 which are operated using modified start times for one or more elements E in each machine.

Figure 12:
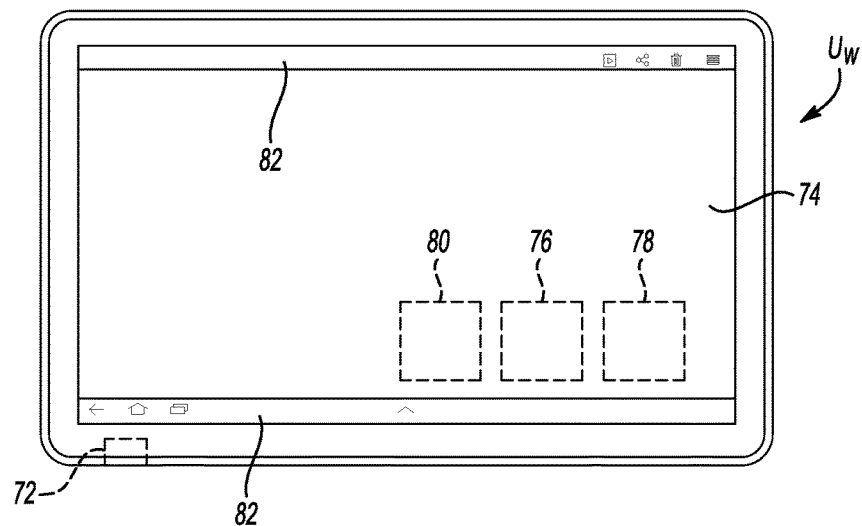
FIG. 12 is a schematic illustration of an example of a user device of FIG. 1.

The AOS 10 can include one or more user devices U (shown in the example of FIGS. 1 and 2 as user devices U . . . Uw and referred to herein collectively as user devices U) in communication with the data collected by the AOS 10. In one example, the user device U can be a portable computing device such as a personal computer, notebook, tablet, smart phone, personal data assistant, etc., including, as shown in FIG. 12, a processor 76 and memory 78, some of which is computer-readable tangible, non-transitory memory arranged on a printed circuit board or otherwise available to the processor 76. The memory 78 may include, by way of example, sufficient read only memory (ROM), optical memory, flash or other solid state memory, and the like. Transitory memory such as random access memory (RAM) and electrically-erasable programmable read-only memory (EEPROM) may also be included, along with other required circuitry (not shown), including but not limited to a high-speed clock, location sensing circuitry, analog-to-digital (A/D) circuitry, digital-to-analog (D/A) circuitry, a digital signal processor, and any necessary input/output (I/O) devices and other signal conditioning and/or buffer circuitry. The user device U can include a connector port 72 for connecting the user device to another device (not shown). The user device U includes a communications interface which can be a wireless or wired interface, for connection of the user device U to the network 80 for communication with one or more of the controllers L1, L2, the servers L3, L4, another of the user devices U, and/or the data storage memory 90. The user device U includes a graphical user interface 74, which in a preferred example is a graphical touch screen, such that a user can provide input to the user device 74, including commands, via the touch screen 74 and/or standard tool bars 82. In one example, the user may monitor the data collected from one or more of the elements E and/or machines 16 in the enterprise 12, which may be displayed on the user device U as a machine control interface 84 (see FIGS. 10 and 11), where the machine control interface 84 can be defined by one of the machine controller L2, the facility server L3 and/or the enterprise server L4. In one example, the user may subscribe to receive alerts for one or more elements E and/or machines 16 being monitored by the user, where the alerts may be received by the user on the user device U as one or more of a text message, instant message, e-mail, or other alert indicator. By way of example, the user can view the heartbeat display 35 for the group of clamp elements E1 . . . E8 shown in FIG. 13 on a user device U, where the user may receive an alert to view the heartbeat 35 in response to an alarm set by the machine controller L2 for element E4 and/or a fault set by the facility server L3 for the clamp element E4. In the heartbeat display 35 presented to the user on the user device U, the cycle time displayed for each of the clamp elements E can be color coded to indicate a condition state of the each respective element E. In the example shown in FIG. 13, element E4 may be a different color, such as red, to indicate a fault condition resultant from the cycle time of element E4 exceeding a tolerance band defined by the baseline heartbeat 27. The remaining cycle time bars may be displayed in a green color, for example, to indicate the associated elements E1, E2, E3, E5, E6, E7 and E8 are operating within the predetermined tolerance, e.g., are exhibiting cycle times with a tolerance band defined by the baseline heartbeat 27.

Figure 8:
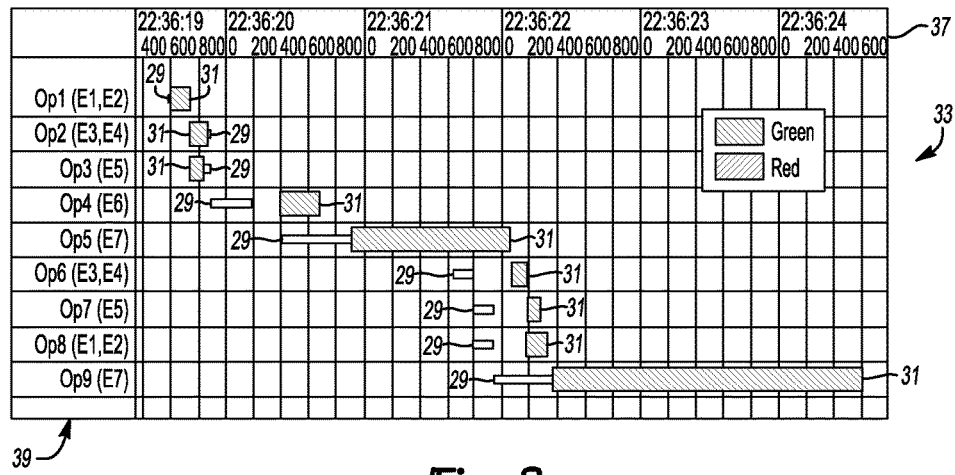
FIG. 8 is a schematic illustration of an example of a machine sequence of operations of a machine of the system of FIG. 1.
Figure 9:
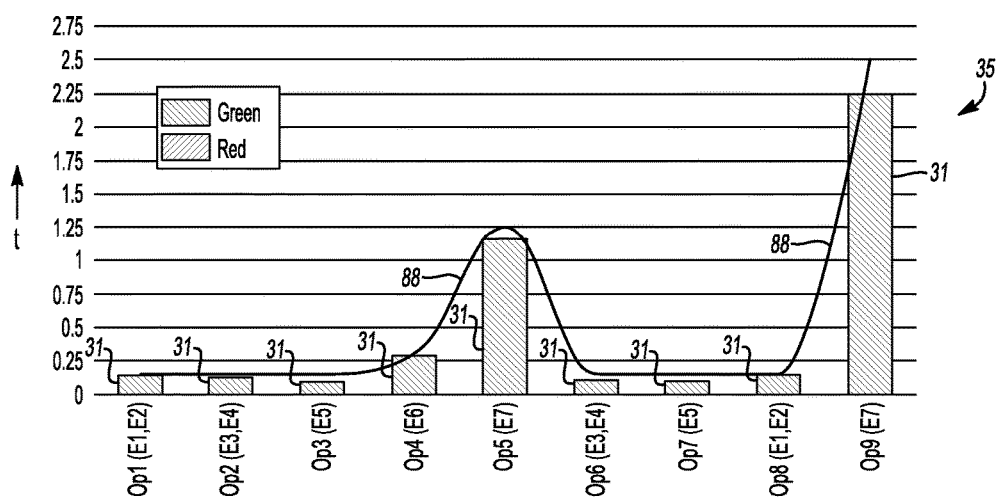
FIG. 9 is a schematic illustration of an example of a machine heartbeat of the sequence of operations of FIG. 8.
Figures 10, 11:
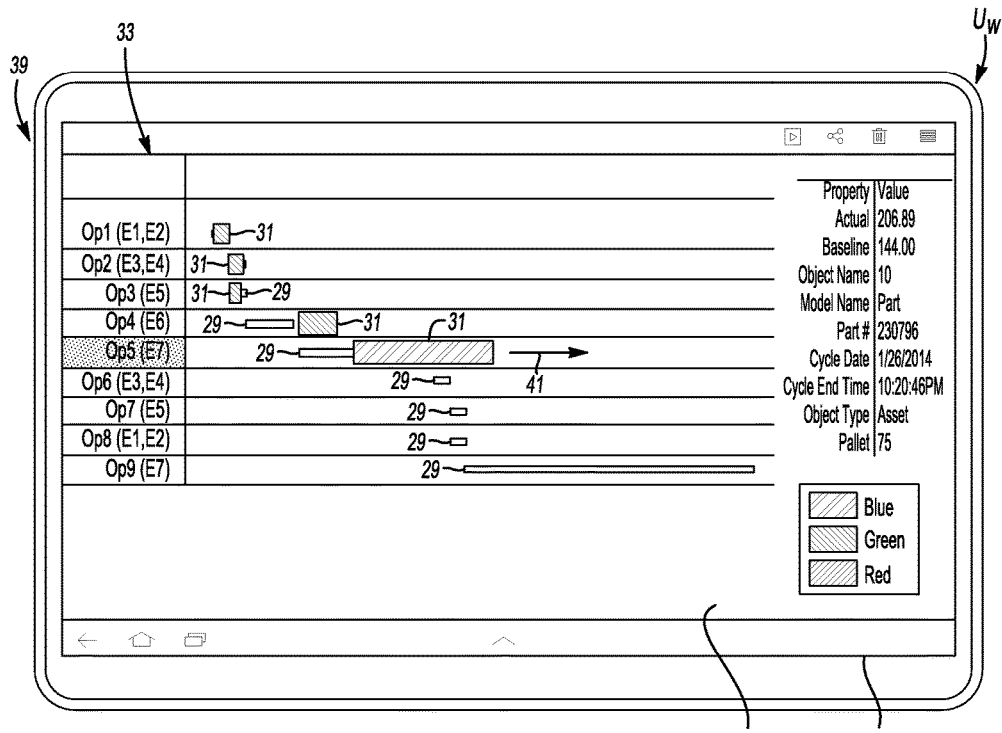
FIG. 10 is a schematic illustration of an example of a machine control interface showing the machine sequence of operations of FIG. 8 displayed on a user device of FIG. 1.
FIG. 11 is a schematic illustration of an example of a machine control interface showing the machine heartbeat of FIG. 9 displayed on a user device of FIG. 1.

The example shown in FIG. 13 is non-limiting, and other formats can be used to display data collected and compiled by the AOS 10. For example, referring to FIGS. 8 and 9, timing data can be displayed as shown in FIG. 8 in a traditional sequence of operation (SOP) display format 33, and/or in a heartbeat display format 35. In the SOP display 33 shown in FIG. 8, the sequence of operations 39 corresponding to the data being displayed is listed vertically (as shown on the page), and in the present example includes operations Op1 through Op9, with operation Op1 being performed by elements E1 and E2 of a machine 16, operation Op2 being performed by elements E3 and E4, and so on. A baseline cycle for each of the operations Op1 . . . Op9 in the SOP 39 is graphically shown by a baseline cycle indicator 29. The actual cycle for each of the operations Op1 . . . Op9 is graphically shown by an actual cycle indicator 31. The actual time 37 is displayed horizontally (as shown on the page), such that the actual time a given operation Op is performed can be determined. Each of the actual cycle indicators 31 may be color coded, e.g., displayed in a color defining the status of the cycle of that operation. In the example shown, the actual cycle indicators 31 are displayed in either a red or green color, with red indicating the actual cycle time is outside of a predetermined tolerance for the cycle of that operation, and green indicating the actual cycle time is within tolerance. In the heartbeat display 35 shown in FIG. 9, the sequence of operations (SOP) 39 corresponding to the data is displayed on the horizontal axis (as shown on the page) with the actual cycle time of each operation Op1 . . . Op9 shown in heartbeat display format by an actual cycle time indicator 31, which may be color coded as previously described for FIG. 8, to indicate whether the cycle time for each respective operation is within tolerance. FIG. 9 further displays the heartbeat 88 of the sequence of operations. The data may be displayed to the user device U in real time, as illustrated by the examples shown in FIGS. 10 and 11. In the example shown in FIG. 10, operations Op1 through Op4 have been completed and are, in the present example, indicated with an actual cycle indicator 31 which is green showing these operations have been completed with timing data which is in tolerance. The operation Op5 is colored blue and/or may be blinking or otherwise distinguished in appearance, for example, highlighted in the SOP listing 39 to indicate that operation Op5 is currently being performed. As indicated by arrow 41, the length of the actual cycle indicator 31 will continue to increase in real time during performance of operation Op5, and will cease growing in length and change to either red or green, in the present example, indicating operation Op5 has been completed and the status of the timing data of Op5 relative to the SOP tolerances set for operation Op5. Similarly, in the example shown in FIG. 11, operation Op2 is colored blue and/or may be blinking or otherwise distinguished in appearance, for example, highlighted in the SOP listing 39 to indicate that operation Op2 is currently being performed. As indicated by arrow 41, the height of the actual cycle indicator 31 will continue to increase in real time during performance of operation Op5, and will cease growing in length and change to either red or green, in the present example, indicating operation Op2 has been completed and the status of the timing data of Op2 relative to the tolerances set for operation Op2. The examples provided herein are illustrative and non-limiting, and it would be understood other arrangements of the data collected by the AOS 10 for one or more of an element E, station ST, SOP 39, machine 16 and/or facility 14 may be used to display the status and/or conditions represented by the collected data.

The example of an AOS 10 shown in FIGS. 1 and 2 is non-limiting, and it would be understood that the AOS 10 shown in FIG. 1 may be implemented in portions to provide advantages in operating and managing operations including automated operations. For example, a machine based AOS 10 may be configured to control an independent, e.g., standalone machine 16, using a machine controller L2 and at least one base layer controller L1, to provide advantages including, for example, to modify the start times of selected stations ST and/or elements E of the machine 16 to decrease power consumption at start-up of the machine cycle and decrease peak power consumption of the machine 16, as previously described herein and illustrated by FIGS. 6 and 7.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A system for controlling automation, the system comprising:
　a plurality of machines;
　wherein each machine of the plurality of machines includes a machine controller and a plurality of elements;
　wherein the machine controller is configured to control the plurality of elements to perform an operational sequence and to collect data generated during performance of the operational sequence by the plurality of elements; and
　a server in communication with each of the plurality of machine controllers to collect the data;
　a facility comprising:
　　the server;
　　a first facility system including the plurality of machines;
　　a second facility system distinct from the first facility system;
　　wherein the server is in communication with the second facility system to collect facility system data from the second facility system;
　wherein the server includes programming for predicting a failure of at least one element of the plurality of elements using the data collected from the plurality of machine controllers in combination with the facility system data collected from the second facility system.

2. The system of claim 1, wherein the server includes programming for predicting a failure of at least another element of the plurality of elements using the data collected from the plurality of machine controllers.

3. The system of claim 1, wherein in response to predicting the failure, the server generates an instruction to the machine controller of the respective machine including the at least one element;
　wherein the instruction is a countermeasure to prevent failure of the at least one element during operation of the respective machine.

4. The system of claim 3,
　wherein the countermeasure is a command to substitute a back-up element for the at least one element.

5. The system of claim 1, wherein the second facility system is an infrastructure system for controlling a power supply of the facility.

6. The system of claim 1, where the second facility system is one of a product assurance system and a production control system.

7. The system of claim 1, wherein at least one machine of the plurality of machines further comprises:
　a first station including a first element of the plurality of elements;
　a second station including a second element of the plurality of elements;
　a first base layer controller in communication with the machine controller and the first station to directly control the first element according to parameters received from the machine controller by the first base layer controller; and
　a second base layer controller in communication with the machine controller and the second station to directly control the second element according to parameters received from the machine controller by the second base layer controller.

8. The system of claim 7, further comprising:
　the first station including a first sensor for sensing a first condition state of the first element;
　the second station including a second sensor for sensing a second condition state of the second element;
　wherein the first base layer controller and the second base layer controller are in communication with each other such that the first base layer controller communicates the first condition state to the second base layer controller and the second base layer controller communicates the second condition state to the first base layer controller.

9. The system of claim 8, wherein:
　the first base layer controller selectively actuates the first element in response to the first condition state and the second condition state; and
　the second base layer controller selectively actuates the second element in response to the first condition state and the second condition state.

10. The system of claim 9, wherein:
　the first base layer controller includes a first data matrix for storing data collected from the first station;
　the second base layer controller includes a second data matrix for storing data collected from the second station;
　the machine controller collects the data from the first data matrix and the second data matrix and coordinates control functions of the first and second base layer controllers using the collected data.

11. The system of claim 10, wherein:
　the first base layer controller compares the data collected from the first station to the parameters received from the machine controller;
　the first base layer controller sets an alarm when the data is outside of the parameters.

* * * * *